US009151298B2

(12) United States Patent
Delache

(10) Patent No.: US 9,151,298 B2
(45) Date of Patent: Oct. 6, 2015

(54) SYSTEM AND METHOD FOR BALANCING AN IMPELLER ASSEMBLY

(75) Inventor: Alain-Jean Delache, Nice (FR)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 737 days.

(21) Appl. No.: 13/503,486

(22) PCT Filed: Oct. 4, 2010

(86) PCT No.: PCT/IB2010/054480
§ 371 (c)(1),
(2), (4) Date: Apr. 23, 2012

(87) PCT Pub. No.: WO2011/051844
PCT Pub. Date: May 5, 2011

(65) Prior Publication Data
US 2012/0207599 A1  Aug. 16, 2012

(30) Foreign Application Priority Data

Oct. 29, 2009 (EP) .................................... 09306031

(51) Int. Cl.
*G01M 1/36* (2006.01)
*F04D 29/66* (2006.01)
*G01M 1/02* (2006.01)
*G01M 1/34* (2006.01)

(52) U.S. Cl.
CPC ............... *F04D 29/662* (2013.01); *G01M 1/02* (2013.01); *G01M 1/34* (2013.01)

(58) Field of Classification Search
CPC .......... F04D 29/662; F01D 5/10; G01M 1/34; G01M 1/36
See application file for complete search history.

(56) References Cited

U.S. PATENT DOCUMENTS

| 4,501,947 | A | * | 2/1985 | Kerlin | 219/68 |
| 4,628,733 | A | * | 12/1986 | Nystuen et al. | 73/462 |
| 4,773,019 | A | * | 9/1988 | Martin et al. | 700/279 |
| 5,199,992 | A | * | 4/1993 | Hines et al. | 118/669 |
| 5,505,083 | A | * | 4/1996 | Hines et al. | 73/462 |
| 5,635,778 | A | * | 6/1997 | Fujita et al. | 310/51 |
| 5,871,314 | A | * | 2/1999 | Trionfetti | 409/165 |
| 5,988,978 | A | * | 11/1999 | Pearce | 416/145 |
| 6,208,160 | B1 | | 3/2001 | Boscolo | |

(Continued)

FOREIGN PATENT DOCUMENTS

| DE | 19501959 A1 | 7/1996 |
| DE | 102006027723 A1 | 1/2007 |

(Continued)

OTHER PUBLICATIONS

Libor Prokop and Leos Chalupa, 3-Phase BLDC Motor Control with Sensorless Back EMF Zero Crossing Detection Using 56F80x, Nov. 2005, Freescale Semiconcuctor, Rev. 1.*

*Primary Examiner* — Edward Look
*Assistant Examiner* — Aaron R Eastman
(74) *Attorney, Agent, or Firm* — Michael W. Haas

(57) ABSTRACT

An impeller assembly including a motor that rotationally drives an impeller is balanced. The impeller assembly is balanced without physically indexing the impeller to determine the rotational position of the impeller while impeller is rotated. For example, the system does not employ an optical sensor, a magnetic sensor (e.g., a Hall sensor), a mechanical indexing sensor, and/or other sensors that physically index the impeller.

15 Claims, 1 Drawing Sheet

(56) References Cited

U.S. PATENT DOCUMENTS

| | | | |
|---|---|---|---|
| 6,520,012 B1* | 2/2003 | Schonfeld | 73/462 |
| 2006/0191336 A1* | 8/2006 | He et al. | 73/462 |
| 2007/0194637 A1* | 8/2007 | Childe et al. | 310/51 |
| 2009/0230905 A1* | 9/2009 | Proctor et al. | 318/400.09 |

FOREIGN PATENT DOCUMENTS

| | | |
|---|---|---|
| EP | 1719955 A1 | 11/2006 |
| WO | WO2005011098 A1 | 2/2005 |

\* cited by examiner

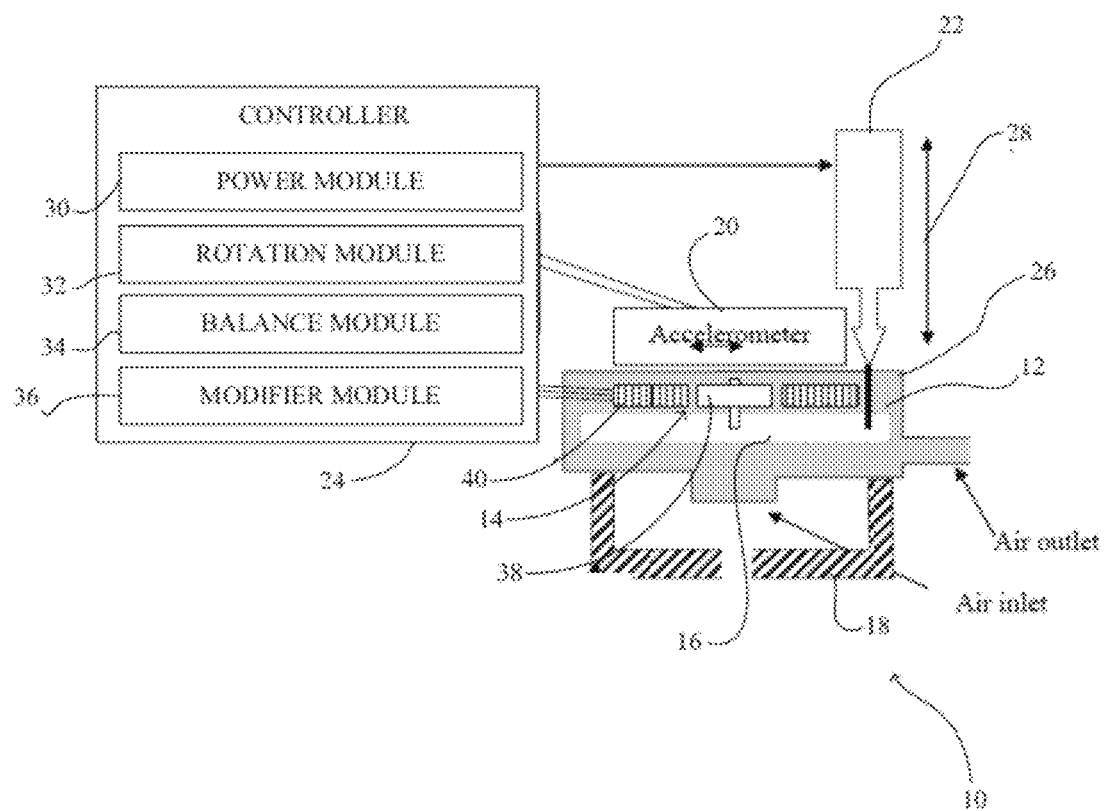

SYSTEM AND METHOD FOR BALANCING AN IMPELLER ASSEMBLY

CROSS-REFERENCE TO RELATED APPLICATIONS

This patent application claims the priority benefit under 35 U.S.C. §371 of international patent application no. PCT/IB2010/054480, filed Oct. 4, 2010, which claims the priority benefit of EP application No. 09306031.7 filed Oct. 29, 2009, the contents of which are incorporated herein by reference.

BACKGROUND OF THE INVENTION

1. Field of the Invention

The invention relates to balancing an impeller assembly that includes an electric motor driving an impeller. In particular, the impeller assembly is balanced without including a dedicated sensor for detecting rotational position of the impeller or motor.

2. Description of the Related Art

Medical respiration systems typically implement impeller assemblies that include a motor and impeller or fan to generate pressurized flows of breathable gas. These impeller assemblies are typically balanced with relative precision to avoid the generation of vibration and/or noise. In order to detect the rotational position of the motor and/or impeller in an impeller assembly for balancing purposes, conventional systems for balancing these impeller assemblies tend to rely on dedicated sensors included in the impeller assembly and/or components or physical features provided on the impeller assembly for physically indexing the rotation of the impeller. This increases the cost of the impeller assembly by the cost of the sensor(s) and installation, the manufacturing costs associated with creating the physical features during manufacture, and/or other costs. Additionally, some conventional techniques that rely on physical indexing of the impeller and/or motor to determine rotational position may not provide sufficient accuracy and/or precision.

SUMMARY OF THE INVENTION

One aspect of the invention relates to a system configured to balance an impeller assembly. In one embodiment, the system comprises a sensor and a controller. The sensor is configured to generate one or more output signals conveying information related to the position and/or motion of an impeller assembly as a whole caused by imbalance in the impeller assembly, wherein the impeller assembly includes a motor and an impeller. The controller is communicatively linked with the sensor, and is configured to provide power to the motor of the impeller assembly to control operation of the motor, wherein the power is provided to the motor by the controller in multiple phases. The controller comprises one or more processors configured to execute one or more modules. The modules comprise a power module, a rotation module, and a balance module. The power module is configured to determine power parameters of the power to be transmitted to the motor to control operating parameters of the motor, wherein the controller provides power to the motor at the determined power parameters. The rotation module is configured to obtain a back electro-motive force signal from the motor, and to determine from the back electro-motive force signal the rotational position of the impeller as the power module provides power to the motor that causes the motor to drive the impeller rotationally. The balance module is configured to determine an imbalance position on the impeller based on the output signals generated by the sensor and the rotational position determined by the rotation module, wherein the imbalance position on the impeller is a location on the impeller where local modification of the mass of the impeller will enhance the balance of the impeller.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the invention, the structural components illustrated herein are drawn in proportion. It is to be expressly understood, however, that the drawings are for the purpose of illustration and description only and are not a limitation of the invention. In addition, it should be appreciated that structural features shown or described in any one embodiment herein can be used in other embodiments as well. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 1 illustrates a system configured to balance an impeller assembly, in accordance with one or more embodiments of the invention.

DETAILED DESCRIPTION OF THE EXEMPLARY EMBODIMENTS

FIG. 1 illustrates a system 10 configured to balance an impeller assembly 12 according to the principles of the present invention. System 10 including a motor 14 that rotationally drives an impeller 16. System 10 balances impeller assembly 12 without physically indexing impeller 16 to determine the rotational position of the impeller while impeller 16 is rotated. For example, system 10 does not employ an optical sensor, a magnetic sensor (e.g., a Hall sensor), a mechanical indexing sensor, and/or other sensors that physically index impeller 16. Determining rotational position of impeller 16 for the purpose of balancing impeller assembly 12 without the implementation of such sensors reduces the cost of manufacturing of the impeller assembly by at least the cost of the sensor componentry and the time required to install any such sensor(s) during manufacture. In one embodiment, system 10 includes a unit mount 18, a motion sensor 20, a mass modifier 22, a controller 24, and/or other components.

In the exemplary embodiments described herein and shown in the drawings, impeller assembly 12 is configured for use in a medical respiration device (e.g., a positive airway pressure device, a ventilator, etc.). It will be appreciated that this is for illustrative purposes, and adaptation of system 10 and/or the techniques disclosed herein to balance other types of motor/impeller systems falls within the scope of this disclosure. Further, in some embodiments, system 10 and/or the techniques described herein for balancing impeller assembly 12 may be adapted to balance other systems in which an electric motor includes a rotor that is rotationally driven by multi-phase power.

Unit mount 18 is configured to removably secure impeller assembly 12. In one embodiment, impeller assembly 12 is housed within a housing 26, and unit mount 18 secures housing 26 to enable system 10 to balance impeller assembly 12. Impeller assembly 12 may be secured by unit mount 18 via suction, releasable straps, snap-fit, friction-fit, and/or other releasable mechanisms for removably securing impeller assembly 12. In one embodiment, unit mount 18 rigidly fixes the rotational and/or linear position of impeller assembly 12 in space. In one embodiment, unit mount 18 is movable (e.g., manually and/or via mechanized manipulation) to control the rotational and/or linear position of impeller assembly 12.

Motion sensor 20 is configured to be mechanically coupled to impeller assembly 12 to move with impeller assembly 12 as a whole (e.g., not rotationally with impeller only). In one embodiment, motion sensor 20 is releasably secured to housing 26 such that movement of housing 26 results in motion sensor 20 experiencing the same or similar motion. In one embodiment, motion sensor 20 is mounted on unit mount 18 such that motion of impeller assembly 12 and unit mount 18 results in motion sensor 20 experiencing the same or similar motion.

Motion sensor 20 is configured to generate one or more output signals conveying information related to position and/or motion of motion sensor 20. For example, motion sensor 20 may include one or more of an accelerometer, a gyroscope, and/or other sensors that generate output signals conveying information related to position and/or motion. In particular, in one embodiment, motion sensor 20 includes a single dimension accelerometer. However, this embodiment is not intended to be limiting.

It will be appreciated that the implementation of motion sensor 20 described above mechanically coupled with impeller assembly 12 is not the only way to detect motion of impeller assembly 12 as a whole. The substitution of other types of sensors for detecting such motion (e.g., optical sensors, image capture/analysis, etc.) falls within the scope of this disclosure.

Mass modifier 22 is configured to selectively modify the mass of impeller 16. In one embodiment, mass modifier 22 includes a drill, a grinder, and/or other tool configured to selectively remove mass from impeller 16 locally at individually selectable locations on impeller 16. In one embodiment, mass modifier 22 includes an applicator configured to affix additional material to impeller 16 locally at individually selectable locations on impeller 16. For example, the applicator may be configured to apply an adhesive to impeller 16 that cures on impeller 16 after application. The adhesive itself may be the source of added mass, or the adhesive may be used to adhere mass to the impeller. As another example, the applicator may be configured to apply material to impeller 16 that is self-adhering (e.g., tape).

In the embodiment illustrated in FIG. 1, during operation, the position of mass modifier 22 in the plane of rotation of impeller 16 is fixed. In this embodiment, to locally modify the mass of impeller 16 at a selected location on impeller 16 the rotational position of impeller 16 is controlled (e.g., as discussed below) to make the selected location accessible to mass modifier 22. Once impeller 16 is positioned properly, then mass modifier 22 is moved in a path transverse to the plane of impeller 16 (e.g., perpendicular to the plane as depicted in FIG. 1 by arrow 28) to access the selected location on impeller 16 and locally modify the mass of impeller 16 at the selected location.

In one embodiment (not shown), rather than holding the position of mass modifier 22 fixed in the plane of impeller 16, the rotation of impeller 16 is arrested without regard for rotational position, and mass modifier 22 is moved to the selected location on impeller 16. In this embodiment, the movement of mass modifier 22 in the plane of impeller 16 to the selected location may be controlled in an automated manner, manually adjusted by a user, or some combination of these.

In one embodiment (not shown), relative positioning of impeller 16 and mass modifier 22 with respect to the plane of impeller 16 to provide the mass modifier with access to a selected location on impeller 16 is accomplished by a combination of controlling the rotational position of impeller 16 and selectively positioning mass modifier 22 in the plane of impeller 16. For example, coarse adjustment of the relative position may be accomplished by controlling rotational position of impeller 16, and fine adjustment of the relative position may be accomplished by selectively positioning mass modifier 22 in the plane of impeller 16. Similarly, the course and fine adjustment roles may be reversed.

Controller 24 is configured to provide control functionality within system 10. In one embodiment, this includes providing control of motor 14 and/or mass modifier 22. Control over the operating parameters of motor 14 (e.g., rotational velocity, rotational acceleration, power, force, torque, etc.) is exercised by controller 24 by controlling power parameters of the power provided to motor 14 from a power source (e.g., a wall plug, a generator, a battery, a capacitor, etc.). In one embodiment, the power provided to motor 14 is multi-phase power (e.g., two-phase power, three-phase power, etc.). The controller 24 is communicatively linked with motion sensor 20 to receive output signals (or information derived therefrom) generated by motion sensor 20.

Although controller 24 is illustrated in FIG. 1 as a single entity, this is not intended to be limiting. In one embodiment, controller 24 includes a plurality of devices operating in coordination. For example, controller 24 may include a separate physical control module for controlling one or both of motor 14 and/or mass modifier 22 linked with a device that provides overall processing and control functionality for system 10 as a whole (e.g., a host computer system). As another example, controller 24 may include a separate sub-system for processing output signals generated by motion sensor 20 prior to implementation within controller 24 as discussed herein. For instance, the separate sub-system may convert the output signals (e.g., analog to digital conversion), amplify the signals, filter the signals, and/or otherwise process the output signals.

Controller 24 includes one or more processors. As such, the one or more processors may include one or more of a digital processor, an analog processor, a digital circuit designed to process information, an analog circuit designed to process information, a state machine, and/or other mechanisms for electronically processing information. As was mentioned above, although controller 24 is shown in FIG. 1 as a single entity, this is for illustrative purposes only. For example, in one embodiment, the functionality attributed below to controller 24 is divided between a first set of one or more processors associated with a computing platform that provides an interface for a user with controller 24. For example, this computing platform may include one or more of a desktop computer, a laptop computer, a handheld computer, a NetBook, a smart phone, a personal digital assistant, and/or other computing platforms. In this embodiment, a second set of one or more processors of controller 24 may include subsystems or modules in communication with one or more of motor 14, motion sensor 20, and/or mass modifier 22. As described above, the second set of one or more processors may be configured to facilitate control of motor 14 and/or mass modifier 22 by controller 24, and/or initial processing of the output signals generated by motion sensor 20.

As is shown in FIG. 1, the one or more processors of controller 24 are configured to execute one or more computer program modules. The one or more modules may include one or more of a power module 30, a rotation module 32, a balance module 34, a modifier module 36, and/or other modules. The one or more processors of controller 24 may be configured to execute modules 30, 32, 34, and/or 36 by software; hardware; firmware; some combination of software, hardware, and/or firmware; and/or other mechanisms for configuring processing capabilities on controller 24.

It should be appreciated that although modules 30, 32, 34, and 36 are illustrated in FIG. 1 as being co-located within a single processing unit, in implementations in which controller 24 includes multiple processors disposed in a plurality of separate subsystems or devices, one or more of modules 30, 32, 34, and/or 36 may be located remotely (at least partially) from the other modules. The description of the functionality provided by the different modules 30, 32, 34, and/or 36 described below is for illustrative purposes, and is not intended to be limiting, as any of modules 30, 32, 34, and/or 36 may provide more or less functionality than is described. For example, one or more of modules 30, 32, 34, and/or 36 may be eliminated, and some or all of its functionality may be provided by other ones of modules 30, 32, 34, and/or 36. As another example, the one or more processors of controller 24 may be configured to execute one or more additional modules that may perform some or all of the functionality attributed below to one of modules 30, 32, 34, and/or 36.

Power module 30 is configured to control power parameters of the power to be provided to motor 14 to control operating parameters of motor 14. For example, during testing of impeller assembly 12 to evaluate the balance of impeller assembly 12, power module 30 determines power parameters that will result in motor 14 driving impeller 16 at a substantially constant rate. The rate at which motor 14 drives impeller 16 may be predetermined, or may be a function of a predetermined power parameter during the testing (e.g., a predetermined power level, current, voltage, frequency, etc.). In one embodiment, the rate at which motor 14 drives impeller 16 during testing (or the power parameter controlling the same) is based on user selection or configuration.

In one embodiment, the power provided to motor 14 by controller 24 is three-phase power. During the delivery of three-phase power to cause operation of motor 14, two of the three phases are energized to cause rotation of a rotor 38 within motor 14 to rotate in windings 40. As rotor 38 is turned through a phase, a voltage is induced in windings 40 by rotation of rotor 38. This voltage, which is known as back electro-motive force, changes with the rotational position of rotor 38 even when rotor 38 is rotated at a constant rate. If plotted as a function of time, the back electro-motive force would appear as a sine wave that crosses through the zero value twice through a 360° rotation (i.e., two "zero-crossings").

Rotation module 32 is configured to obtain a back electro-motive force signal from motor 14. Typically, the voltage on the non-energized phase provides the back electro-motive force. In one embodiment, rotation module 32 obtains non-energized voltages of one or more of the phases over which power is provided to motor 14. From the obtained back electro-motive force signal, rotation module 32 is configured to determine information related to the rotation of motor 14 and/or impeller 16. This information may include one or more of angular acceleration, angular velocity, and/or rotational position.

By way of non-limiting example, in one embodiment, rotation module 32 looks for zero-crossings of the back electro-motive force signal, and changes a state that begins to count time until the next zero-crossing. The period of time between zero-crossings is then used to calculate angular velocity ($\omega$) and to resolve rotational position ($\theta$) of rotor 38 and/or impeller 16.

The balance module 34 is configured to determine information related to the balance of impeller assembly 12. The information related to the balance of impeller assembly 12 may include one or both of an amount of imbalance and/or an imbalance position. The amount of imbalance may be quantified by how out of balance impeller assembly 12 is. For instance, the amount of imbalance may be expressed in terms of the amount of mass that should be added to or taken away from impeller 16 to balance impeller assembly 12, the moment at which the mass should be added to or taken away from impeller 16 to balance impeller assembly 12, and/or otherwise quantify the imbalance of impeller assembly 12. The imbalance position may be related to the location on motor 14 at which the mass of impeller 16 should be modified to balance impeller assembly 12. In one embodiment, the imbalance position on impeller 16 can be expressed as the rotational position ($\theta$) of impeller assembly 12.

In one embodiment, to determine the information related to the balance of impeller assembly 12, balance module 34 receives the output signals generated by motion sensor 20 and processes the output signals to determine the balance information. By way of non-limiting example, to determine the imbalance level, the output signals may be filtered, and/or sampled, at a frequency corresponding to the angular velocity ($\omega$) of impeller assembly 12. For instance, if motion sensor 20 includes a single-dimension accelerometer mechanically coupled to impeller assembly 12, the output signals of the accelerometer may be processed by Fast Fourier Transform, and then filtered to the frequency described above. Upon filtering, resulting signal should appear as a sine wave having a period corresponding to the angular velocity (w) of impeller assembly 12. The magnitude of the maximum is related to the imbalance level of impeller assembly 12. In this example, the maximum of the filtered output signals occurs at the point in time at which the imbalance position of impeller assembly 12 is aligned with the direction of the accelerometer, which enables balance module 34 to determine the imbalance position.

The modifier module 36 is configured to control mass modifier 22 to locally modify the mass of impeller 16 at the imbalance position by balance module 34. The magnitude of the mass modification may be based on the imbalance amount determined by balance module 34, or may be a standard amount. As was discussed above with respect to mass modifier 22, in one embodiment, controlling mass modifier 22 to modify the mass of impeller 16 comprises positioning mass modifier 22 at the appropriate imbalance position in the plane of impeller 16, and then moving mass modifier 22 transverse to impeller 16 so that mass modifier 22 can access impeller 16 to modify the mass. In one embodiment, controlling mass modifier 22 to modify the mass of impeller 16 comprises waiting until impeller assembly 12 has been rotated to an appropriate position (e.g., $\theta$), and then moving mass modifier 22 transverse to the plane of impeller 16 to access impeller 16.

During modification of the mass of impeller 16, impeller assembly 12 may need to be braked to ensure that impeller 16 does not rotate during mass modification. This braking may be accomplished via any braking mechanism, including mechanical brakes that are automatically or manually applied to impeller 16. In one embodiment, power module 30 controls the power provided to motor 14 to brake impeller 16. In this embodiment, power module 30 sets the voltages to the phases of power provided to impeller assembly 12 at fixed levels so that motor 14 will hold rotor 38 and impeller 16 at a fixed rotational position, and resist external forces to rotate impeller 16 and/or rotor 38.

In an embodiment in which the position of mass modifier 22 is fixed in the plane of rotation of impeller 16, power module 30 sets the voltages to the phases of power provided to impeller assembly 12 at fixed levels that locate the imbalance position (θ) for access by mass modifier 22 and hold impeller 16 and rotor 38 in place. The offset of the electrical rotation of the three phases are equivalent to an offset of mechanical rotation of motor 14 by 120°. Thus, to position impeller assembly 12 at the imbalance position (θ), power module 30 adjusts the phase voltages as follows:

Voltage Phase $A = X \sin(\theta)$

Voltage Phase $B = X \sin(\theta+120)$,

Voltage Phase $C = X \sin(\theta+240)$ and the gain X is increased to a level at which impeller 16 and rotor 38 will be held in place rotationally. This enables the mass of impeller 16 to be modified at the imbalance position without requiring the need for additional sensing or braking components which would increase the overall cost and/or complexity of system 10 and/or impeller assembly 12.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A system configured to balance an impeller assembly, wherein the system comprises:
   (a) a sensor configured to generate a signal conveying information related to the position, motion, or both of an impeller assembly as a whole caused by imbalance in the impeller assembly, wherein the impeller assembly includes a motor and an impeller;
   (b) a controller communicatively linked with the sensor, the controller being configured to provide power to the motor of the impeller assembly to control operation of the motor, wherein the power is provided to the motor by the controller in multiple phases, and wherein the controller comprises one or more processors configured to execute one or more modules, the modules comprising:
       (1) a power module configured to determine power parameters of the power to be transmitted to the motor to control operating parameters of the motor, wherein the controller provides power to the motor at the determined power parameters,
       (2) a rotation module configured to obtain a back electro-motive force signal from the motor, and to determine from the back electro-motive force signal the rotational position of the impeller as the power module provides power to the motor that causes the motor to drive the impeller rotationally; and
       (3) a balance module configured to determine an imbalance position on the impeller based on the output signals generated by the sensor and the rotational position determined by the rotation module, wherein the imbalance position on the impeller is a location on the impeller where local modification of the mass of the impeller will enhance the balance of the impeller; and
   (c) an assembly interface configured to removably seat the motor and the impeller such that the motor is removably connected to the controller.

2. The system of claim 1, further comprising:
a mass modifier configured to selectively modify the mass of the impeller, and wherein the one or more computer program modules comprise a modifier module configured to control the mass modifier to locally modify the mass of the impeller at the imbalance position determined by the balance module.

3. The system of claim 2, wherein the mass modifier is configured to selectively modify the mass of the impeller by selectively removing material from the impeller.

4. The system of claim 2, wherein the mass modifier is configured to selectively modify the mass of the impeller by selectively affixing additional material to the impeller.

5. The system of claim 1, wherein the sensor is mechanically coupled to the impeller assembly, and wherein the sensor is configured to generate the one or more output signals responsive to the position and/or motion of the sensor.

6. A method of balancing an impeller assembly that includes a motor and an impeller; with a balancing system comprising a sensor, a controller and an assembly interface, wherein the method comprises:
   removably seating the motor and the impeller with the assembly interface such that the motor is removably connected to the controller;
   receiving output signals generated by the sensor, the sensor being configured to generate the output signals such that the output signals convey information related to position and/or motion of the impeller assembly;
   providing multi-phase power to the motor such that the motor drives the impeller to rotate;
   receiving a back electro-motive force signal from the motor;
   determining, from the back electro-motive force signal, the rotational position of the impeller as the impeller is driven rotationally by the motor; and
   determining an imbalance position on the impeller based on the output signals received from the sensor and the determined rotational position of the impeller as the impeller is driven rotationally by the motor, wherein the imbalance position on the impeller is a location on the impeller where local modification of the mass of the impeller will enhance the balance of the impeller.

7. The method of claim 6, further comprising selectively modifying the mass of the impeller at the determined imbalance position.

8. The method of claim 7, wherein selectively modifying the mass of the impeller comprises selectively removing material from the impeller.

9. The method of claim 7, wherein selectively modifying the mass of the impeller comprises selectively affixing additional material to the impeller.

10. The method of claim 6, wherein the sensor is mechanically coupled to the impeller assembly, and wherein the sensor is configured to generate the one or more output signals responsive to the position and/or motion of the sensor.

11. A system configured to balance an impeller assembly that includes a motor and impeller, wherein the system comprises:
   means for receiving output signals generated by a sensor, the sensor being configured to generate the output signals such that the output signals convey information related to position and/or motion of the sensor;

means for providing multi-phase power to the motor such that the motor drives the impeller to rotate;

means for receiving a back electro-motive force signal from the motor;

means for determining, from the back electro-motive force signal, the rotational position of the impeller as the impeller is driven rotationally by the motor;

means for determining an imbalance position on the impeller based on the output signals received from the sensor and the determined rotational position of the impeller as the impeller is drive rotationally by the motor, wherein the imbalance position on the impeller is a location on the impeller where local modification of the mass of the impeller will enhance the balance of the impeller; and means for removably seating the motor and the impeller such that the motor is removably connected to the means for providing multi-phase power to the motor.

12. The system of claim 11, further comprising means for selectively modifying the mass of the impeller at the determined imbalance position.

13. The system of claim 12, wherein the means for selectively modifying the mass of the impeller comprises means for selectively removing material from the impeller.

14. The system of claim 12, wherein the means for selectively modifying the mass of the impeller comprises means for selectively affixing additional material to the impeller.

15. The system of claim 12, wherein the sensor is mechanically coupled to the impeller assembly, and wherein the sensor is configured to generate the one or more output signals responsive to the position and/or motion of the sensor.

* * * * *